United States Patent
Geysen

(10) Patent No.: US 9,440,794 B2
(45) Date of Patent: Sep. 13, 2016

(54) CLOSED CONVEYOR BELT

(71) Applicant: VEJOPIROX, naamloze vennootschap, Herselt (BE)

(72) Inventor: Alex Jean J Geysen, Herselt (BE)

(73) Assignee: VEJOPIROX, NAAMLOZE VENNOOTSCHAP, Herselt (BE)

( * ) Notice: Subject to any disclaimer, the term of this patent is extended or adjusted under 35 U.S.C. 154(b) by 0 days.

(21) Appl. No.: 14/712,164

(22) Filed: May 14, 2015

(65) Prior Publication Data
US 2015/0329293 A1    Nov. 19, 2015

(30) Foreign Application Priority Data
May 15, 2014  (BE) .................... 2014/0361

(51) Int. Cl.
| | |
|---|---|
| *B65G 15/62* | (2006.01) |
| *B65G 21/08* | (2006.01) |
| *B65G 39/12* | (2006.01) |
| *B65G 21/20* | (2006.01) |
| *B65G 37/00* | (2006.01) |
| *B65G 15/28* | (2006.01) |
| *B65G 23/04* | (2006.01) |
| *B65G 69/18* | (2006.01) |

(52) U.S. Cl.
CPC ............... *B65G 21/20* (2013.01); *B65G 15/28* (2013.01); *B65G 15/62* (2013.01); *B65G 21/08* (2013.01); *B65G 23/04* (2013.01); *B65G 37/00* (2013.01); *B65G 39/12* (2013.01); *B65G 69/181* (2013.01)

(58) Field of Classification Search
CPC  B65G 21/2081; B65G 69/18; B65G 69/181; B65G 69/183; B65G 69/185; B65G 69/187; B65G 15/62; B65G 21/08; B65G 21/20
USPC .......... 198/860.3–860.5, 540, 544, 546, 547, 198/550.9, 836.1
See application file for complete search history.

(56) References Cited

U.S. PATENT DOCUMENTS

| | | | | |
|---|---|---|---|---|
| 4,204,595 A | * | 5/1980 | Marrs ............... | B65G 21/2081 198/836.1 |
| 4,321,996 A | * | 3/1982 | Sancken ............... | B65G 21/20 198/499 |
| 4,674,626 A | * | 6/1987 | Adcock .................. | B65G 15/60 198/720 |
| 5,129,508 A | * | 7/1992 | Shelstad ............ | B65G 21/2081 198/836.1 |
| 5,400,897 A | * | 3/1995 | Doyle .................... | B65G 45/18 198/496 |
| 5,660,283 A | * | 8/1997 | Groh ..................... | B65G 19/14 198/690.2 |
| 5,762,712 A | * | 6/1998 | Sohn ...................... | B05C 19/04 118/419 |
| 7,673,741 B2 | * | 3/2010 | Nemedi ................ | B65G 15/42 198/834 |
| 8,925,718 B2 | * | 1/2015 | Miles .................... | B65G 21/06 198/860.1 |
| 2002/0139643 A1 | * | 10/2002 | Peltier .................. | B65G 15/08 198/821 |
| 2012/0018283 A1 | | 1/2012 | Dallner et al. | |

FOREIGN PATENT DOCUMENTS

| | | |
|---|---|---|
| GB | 1 566 549 A | 5/1980 |
| JP | 2004 051338 A | 2/2004 |

OTHER PUBLICATIONS

BE Search Report, dated Feb. 2, 2015, from corresponding BE application.

* cited by examiner

*Primary Examiner* — Mark A Deuble
(74) *Attorney, Agent, or Firm* — Young & Thompson

(57) ABSTRACT

Closed conveyor belt with a housing (2) that encloses a conveyor belt (11) that can be set in motion by a drive, characterized in that both edges (22) of the conveyor belt (11), that extend in the direction of movement (P) of the conveyor belt, extend through the housing (2) by a protruding section (23) that extends through slots (24) provided to this end in the housing (2).

19 Claims, 5 Drawing Sheets

CLOSED CONVEYOR BELT

FIELD OF THE INVENTION

The present invention relates to a closed conveyor belt.
More specifically, the invention concerns a closed conveyor belt with a housing that encloses a conveyor belt that is set in motion by means of a drive.

BACKGROUND OF THE INVENTION

This drive is often in the form of a drive drum or drive roller in combination with a return drum or return roller.

The conveyor belt is a long closed loop as it was that is affixed around the two aforementioned drums so that two tracks are formed in this way: a top track on which the product to be transported is laid and a bottom track that is the returning conveyor belt.

The conveyor belt moves in the housing by being driven by the drive drum.

The space between the two tracks in which both drums are located will be designated hereinafter as 'the interspace'.

Such conveyor belts are used for transporting fragile or dusty products or materials, whereby the housing will ensure that the environment around the conveyor belt is not fouled, for example by products falling from the conveyor belt onto the ground or by dust originating from the products getting into the environment. This will also contribute to better hygiene.

Such conveyor belts can also be used for hazardous products for example, as possible interaction or contact between the product and the external environment is excluded.

In order to experience the least possible resistance when setting the conveyor belt into motion, the edge of the conveyor belt will be at a certain distance from the housing. This means that there is a certain space or clearance between the edge of the conveyor belt and the housing.

Such known installations also present the disadvantage that products in the vicinity of the edge of the conveyor belt can fall through the aforementioned space, whereby they fall on the base of the housing below the conveyor belt or on the bottom track of the conveyor belt in the interspace between the tracks of the conveyor belt.

This can happen for example by pouring products or materials onto the conveyor belt through an opening provided to this end in the housing.

This not only leads to a loss of products or materials, but it also means that it is necessary to regularly clear the housing from such fouling.

It goes without saying that this is a time-consuming job as the conveyor belt then has to be stopped and the housing has to be opened.

It is also possible that products or materials fall at the location of the drive drum or return drum of the conveyor belt, such that these products or materials can cause faults, blockages and similar of the drums.

The material that gets onto the bottom track can also cause faults or blockages when it falls by the drum due to the movement of the conveyor belt.

Such conveyor belts also have the additional disadvantage that a lot of wear occurs.

The purpose of the present invention is to provide a solution to at least one of the aforementioned and other disadvantages.

SUMMARY OF IN THE INVENTION

The object of the present invention is a closed conveyor belt with a housing that encloses a conveyor belt that can be set in motion by means of a drive, whereby both edges of the conveyor belt, that extend in the direction of movement of the conveyor belt, extend through the housing by a protruding section that extends through slots provided to this end in the housing.

An advantage is that the products or materials that are on the conveyor belt can no longer fall from the conveyor belt onto the base of the housing or cause blockages or damage at the location of the drive. Much less wear will also occur.

For example, the drive can be constructed in the form of a drive drum and a return drum. A drive drum and return drum also means a drive roller and return roller.

This means that there is no loss of products or materials and that the housing needs to be cleaned much less, if at all.

Another advantage is that no material can get into the interspace between the two tracks of the conveyor belt. In other words, the aforementioned drums that are in this interspace are completely screened off from the material or product that is moved with the conveyor belt so that the drums cannot be blocked or damaged.

It is important to note that with a conveyor belt according to the invention, there are no moving parts in the housing, in addition to the conveyor belt, the drive drum and the return drum.

Preferably the drive is formed by a return drum and drive drum, and the ends of the return drum and/or drive drum extend through the housing through openings provided to this end in the housing.

This has the advantage that the protruding section of the conveyor belt will be guided over the drums, so that these sections of the conveyor belt are supported by the drums. This will ensure that the conveyor belt is nicely flat without drooping edges. This will play a role in particular when the conveyor belt is made of a flexible material.

In a practical embodiment the aforementioned protruding section of the conveyor belt and/or the protruding section of the return drum and/or drive drum are covered by a guard.

This will ensure that the moving parts that are outside the housing are protected.

According to a preferred characteristic of the invention, means are provided that ensure a barrier between the protruding section and the slot in the housing and/or between the drive drum and the opening concerned in the housing and/or between the return drum and the opening concerned in the housing.

This has the advantage that dust and products or materials of small dimensions cannot come out of the housing, but are blocked by the aforementioned means. These means will also ensure that no dust and products or materials of small dimensions can get onto the base of the housing under the conveyor belt.

The housing will as it were be completely closed off from the external environment. The interspace between the two tracks of the conveyor belt is as good as hermetically sealed in this way.

BRIEF DESCRIPTION OF THE DRAWINGS

With the intention of better showing the characteristics of the invention, a few preferred embodiments of a closed conveyor belt according to the invention are described hereinafter by way of an example, without any limiting nature, with reference to the accompanying drawings, wherein.

DETAILED DESCRIPTION OF THE INVENTION

Figure 1:
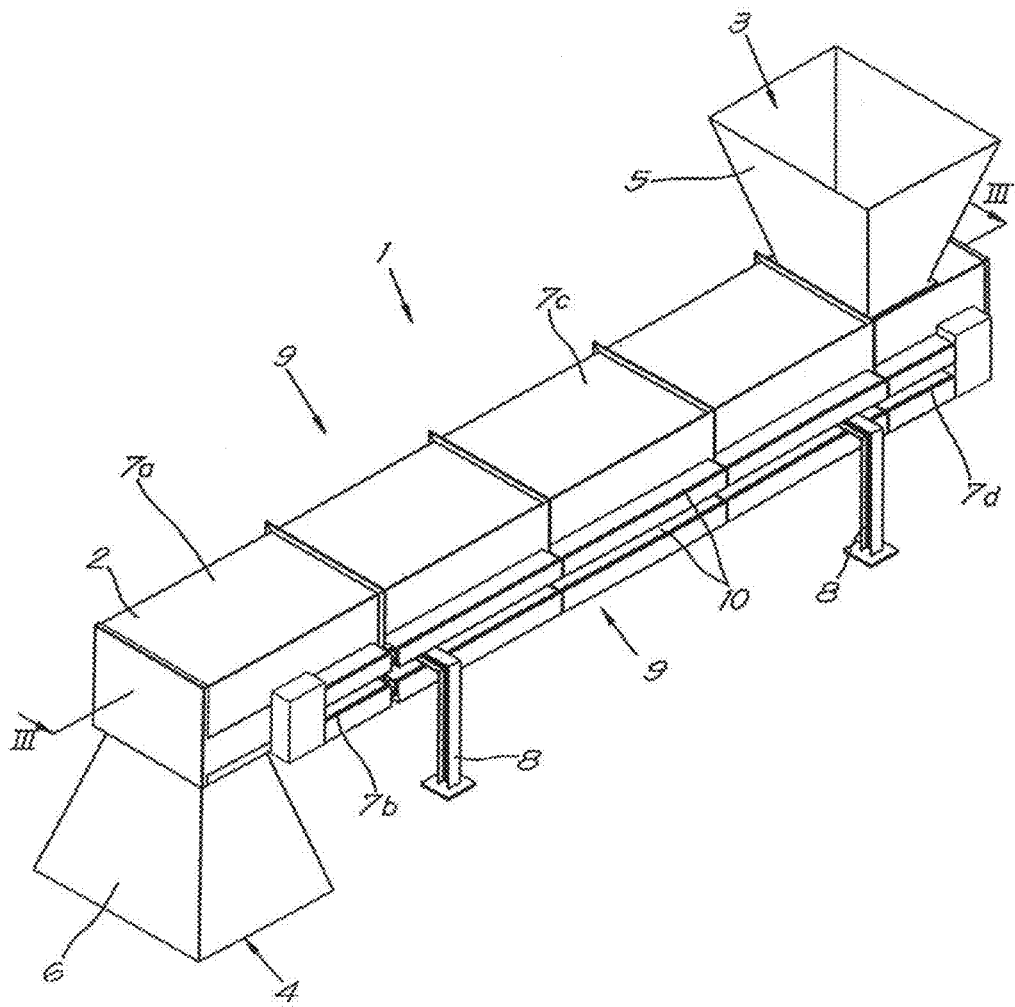
FIG. 1 schematically shows a perspective view of a closed conveyor belt according to the invention.
Figure 2:
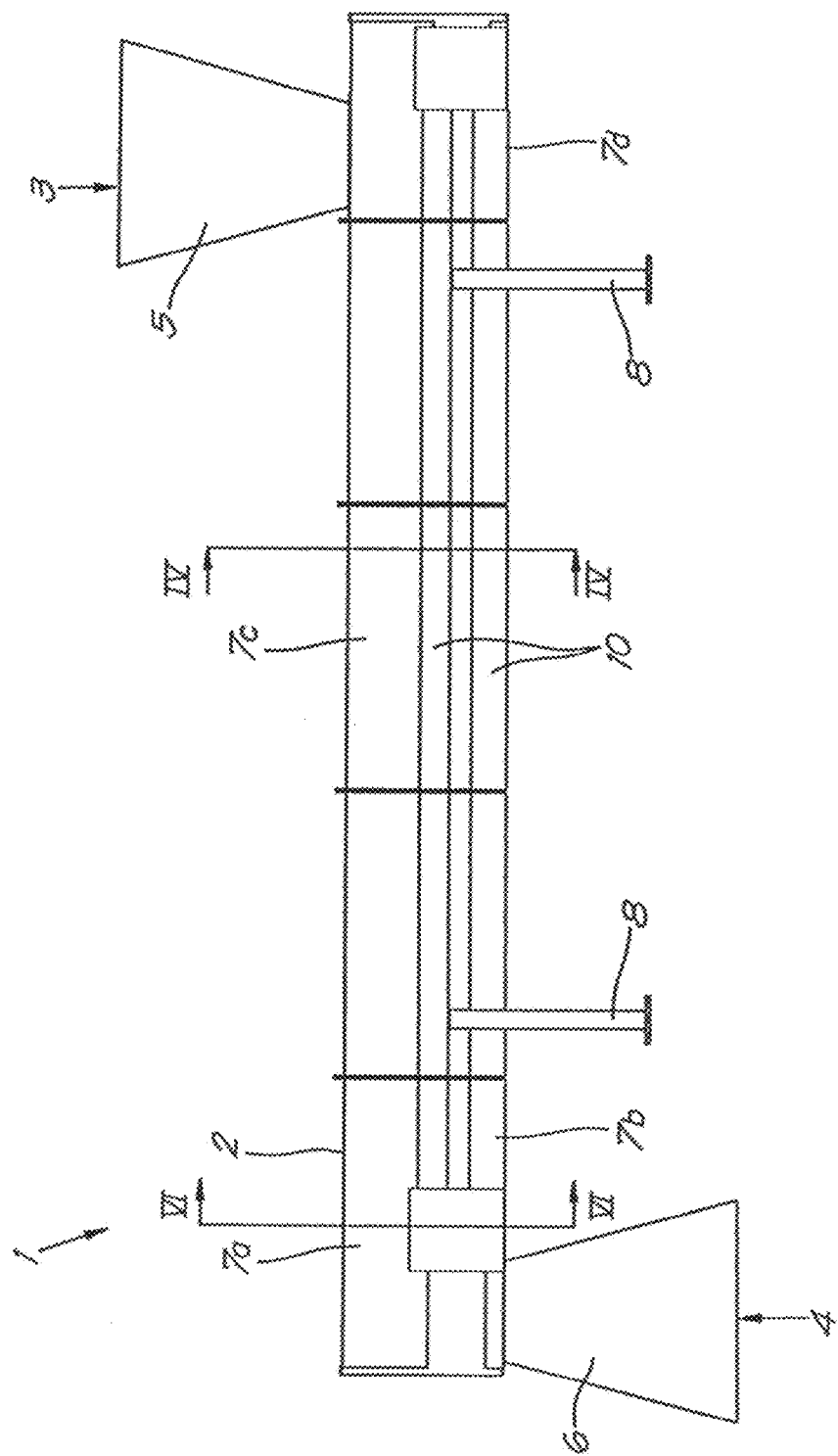
FIG. 2 shows a side view of FIG. 1.

The closed conveyor belt 1 according to the invention shown in FIGS. 1 and 2 comprises a housing 2, which in this case is provided with an input opening 3 and an output opening 4 for the input and output respectively of the material or products to be transported.

The input opening 3 and output opening 4 are provided with an inlet hopper 5 and outlet hopper 6 respectively. It is clear that only one or none of the two aforementioned hoppers 5, 6 can be present.

Without limiting the invention to this in any way, the closed conveyor belt 1 can be used for ground or shredded plastic material for example that is produced during waste processing.

The housing 2 is constructed from different parts, a number of which are indicated by reference FIGS. 7a to 7d. The parts 7a-7d are assembled to form the housing 2.

The housing 2 is also provided with supporting legs 8 with which the closed conveyor belt 1 can be placed on a base.

The housing is provided with guards 10 on two opposite sides 9.

Figure 3:
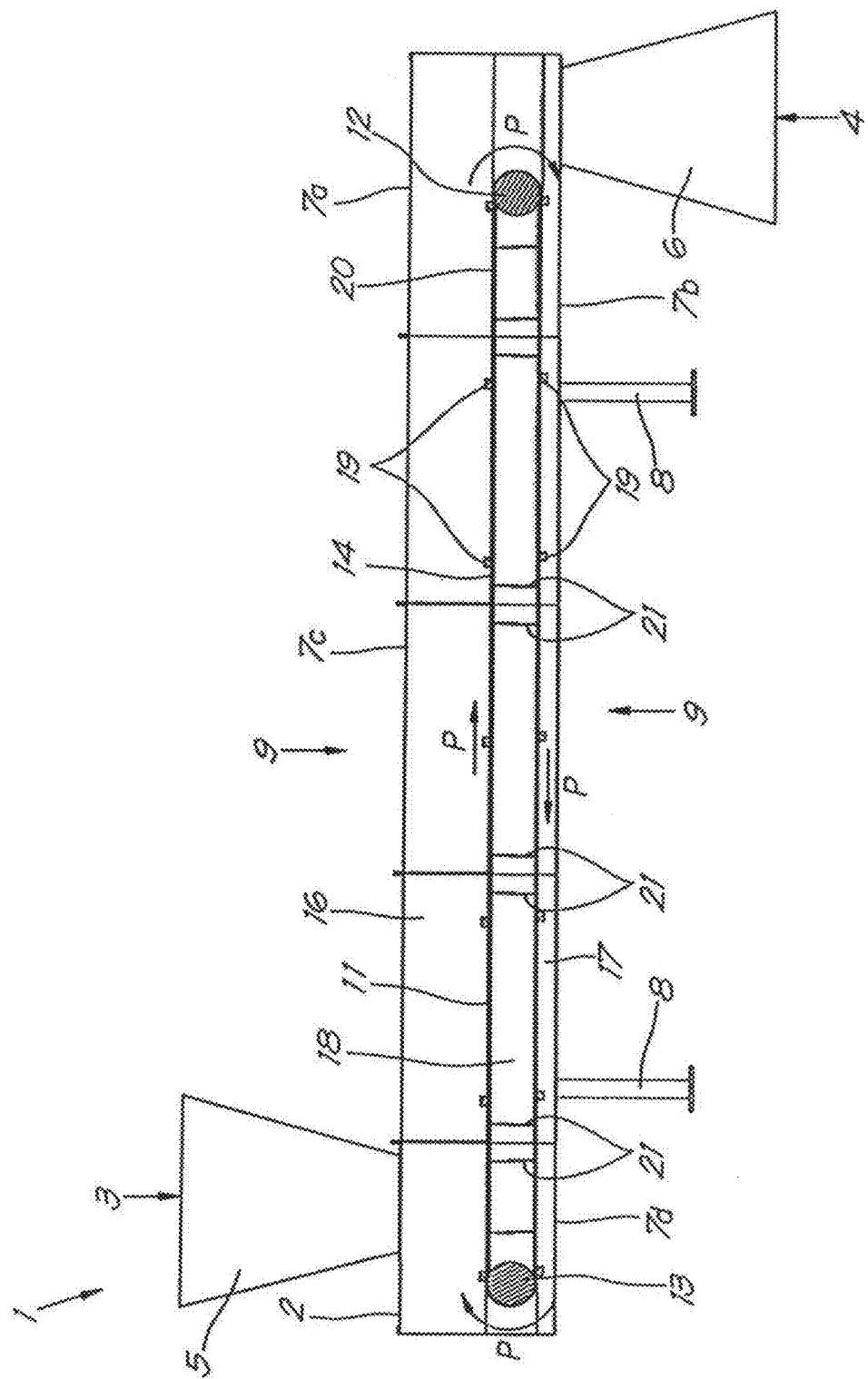
FIG. 3 shows a cross-section according to line III-III of FIG. 1.

FIG. 3 shows a cross-section according to line III-III of FIG. 2.

This drawing clearly shows that there is a conveyor belt 11 in the housing 2 that is affixed around two drums or rollers, respectively a drive drum 12 and a return drum 13. This drive drum and return drum form the drive of the conveyor belt 1. It is clear that the drive can also be constructed in a different way without departing from the scope of the invention.

As a result two tracks occur: a top track 14 on which the product or material to be transported goes and a bottom track 15 that concerns the returning conveyor belt 11.

The drive drum 12 will ensure that the conveyor belt 11 is set in motion in the direction of movement according to arrow P.

The top track 14 moves in the direction from the input opening 3 to the output opening 4.

At the location of the drive drum 12 the conveyor belt 11 will reverse as it were, so that the bottom track 15 will move forwards from the output opening 4 to the input opening 3.

The conveyor belt 11 will demarcate three zones or compartments in the housing 2: a top compartment 16 that is above the conveyor belt 11, a bottom compartment 17 that is below the conveyor belt 11, and an interspace 18 that is enclosed by the two tracks 14 and 15 of the conveyor belt 11.

Note that the drive drum 12 and the return drum 13 are located in this interspace 18.

The conveyor belt 11 is provided with catches 19 that extend transversely to the direction of movement P of the conveyor belt 11. In this case the catches 19 are constructed as transverse slats on the conveyor belt 11.

In a preferred embodiment the conveyor belt 11 is at least partially supported by a flat plate 20 or similar.

In this case the top track 14 of the conveyor belt 11 is supported by means of a flat plate 20 that extends from the drive drum 12 to the return drum 13. It is possible that a flat plate 20 is also provided that is just above and against the bottom track 15.

The flat plate 20 will ensure that the conveyor belt 11 will not sag under the weight of the material or products that are on it.

In this case, but not necessarily, the aforementioned flat plate 20 is supported by means of reinforcing ribs 21 or supporting slats that are provided in the interspace 18 enclosed by the conveyor belt 11, whereby the reinforcing ribs 21 or supporting slats are placed in crossed pairs. As can be seen in FIG. 3, they are positioned spread over the entire length of the conveyor belt 11.

Figure 4:
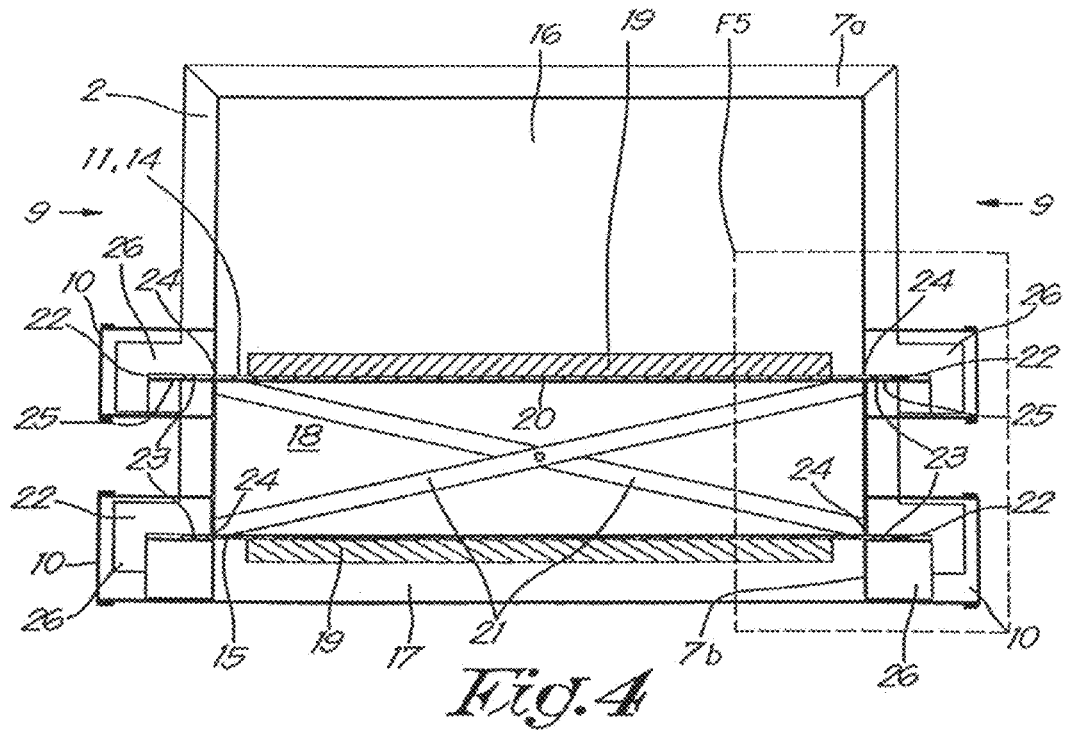
FIG. 4 shows a cross-section according to line IV-IV of FIG. 2.

FIG. 4 shows a cross-section according to line IV-IV of FIG. 2. This drawing clearly shows that the edges 22 of the conveyor belt, that extend in the direction of movement P of the conveyor belt 11, extend by a protruding section 23 through the housing 2.

The housing 2 is provided with slots 24 to this end, through which the protruding section 23 comes out of the housing 2.

In such a case, but not necessarily, the flat plate 20 also protrudes through the aforementioned slots 24 by its two opposite edges 25.

When two flat plates 20 are provided, this means that the interspace 18 has no moving parts, with the exception of the drums 12 and 13.

The slots 24 have the shape of a type of long loop in the two opposite sides 9.

In such a case the slot 24 is formed by cutaways being formed between the composite parts 7a-7d of the housing 2, after they have been assembled to form the housing 2, in order to form the slot 24. In other words: when assembling the housing 2 the slots 24 are formed automatically. This has the advantage that after assembling the housing 2 no slots 24 have to be made by drilling, sawing or other processes.

The aforementioned guards 10 go over the protruding sections 23, 24 of the conveyor belt 11 and the flat plate 20. In this case a separate guard 10 is provided for the protruding section 23 of the top track 14 and the bottom track 15. It is of course not excluded that one guard 10 is provided on each side 9 of the housing 2 that comprises both protruding sections 23, 24.

Figure 5:
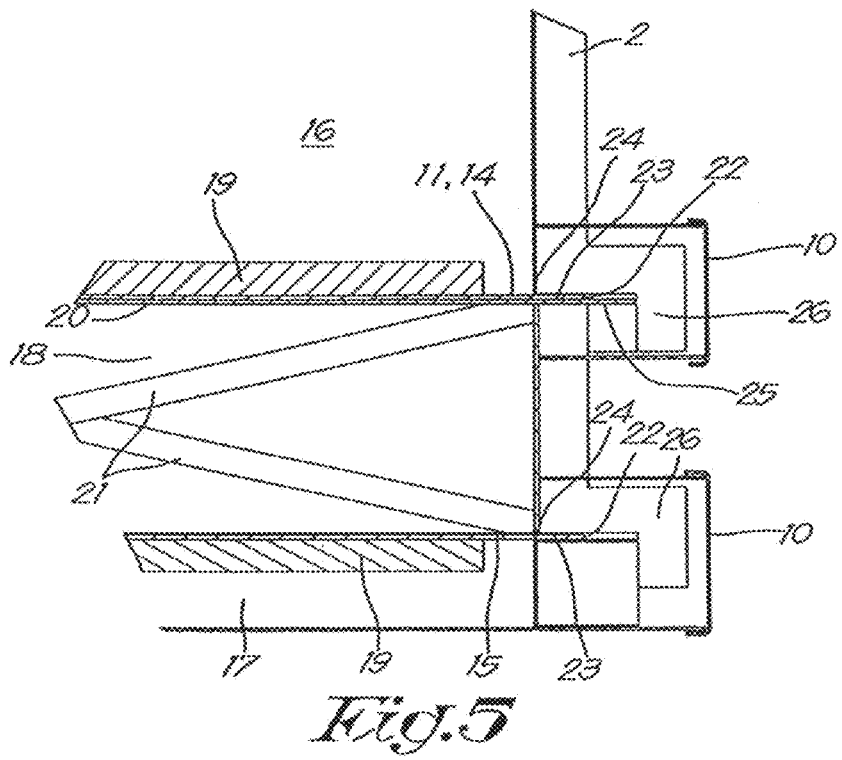
FIG. 5 shows the section indicated by F5 in FIG. 4 in more detail.

The detail in FIG. 5 clearly shows that means 26 are provided that ensure a barrier between the protruding section 23 and the slot 24 in the housing 2.

These means 26 preferably comprise at least one seal, labyrinth seal or brush.

In this case the means 26 are formed by seals. The seals will ensure that dust and material or products of small dimensions cannot get outside through the slot 24.

FIG. 4 clearly shows the form of the catches 19. In this case they are constructed as slats, but is it is clear that the invention is not limited to this.

The reinforcing ribs 21 or supporting slats that are placed in crossed pairs can be clearly seen in FIG. 4.

Figure 6:
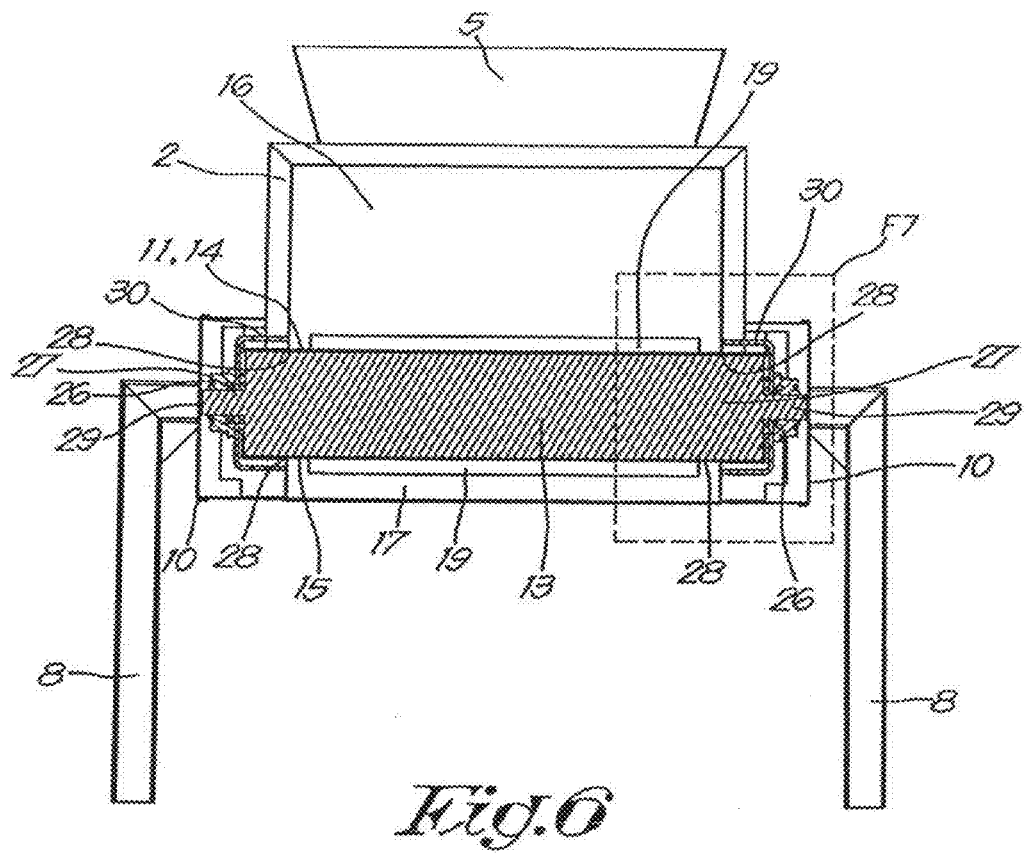
FIG. 6 shows a cross-section according to line VI-VI of FIG. 2.
Figure 7:
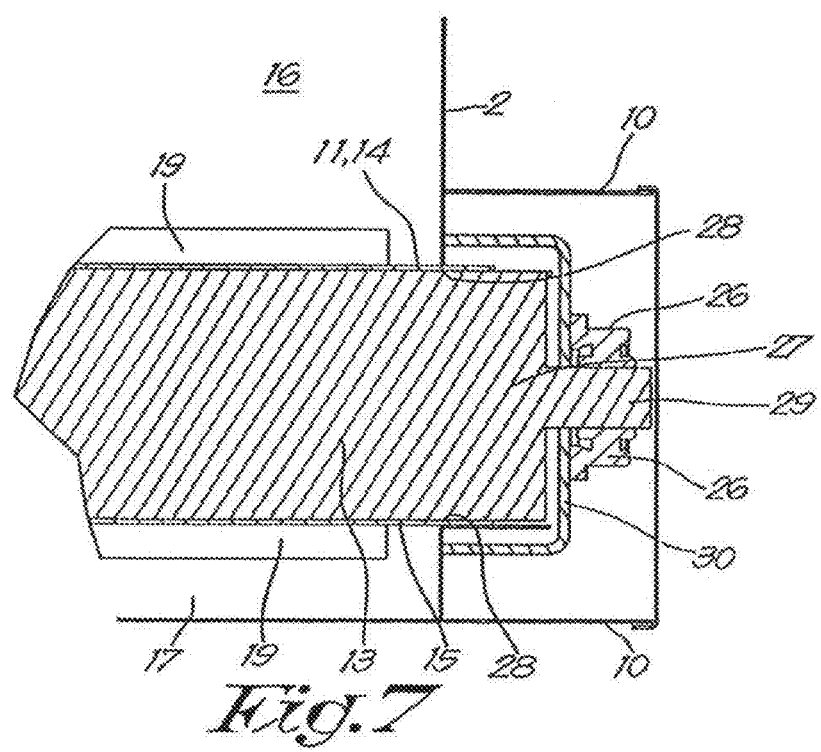
FIG. 7 shows the section indicated by F7 in FIG. 6 in more detail.

FIG. 6 shows a cross-section according to line VI-VI of FIG. 2, whereby FIG. 7 shows a detail of FIG. 6.

It goes without saying that a similar cross-section is obtained at the location of the other drum 12.

It can clearly be seen in FIGS. 6 and 7 that in this case both ends 27 of the drums 12 and 13 extend through the housing 2.

To this end the housing 2 is provided with openings 28. These openings 28 can be formed in a similar way to the slots 24 by the composite parts 7a-7d of the housing 2.

The shafts 29 of the drums 12, 13 are affixed in the housing 2 on supports 30 provided to this end.

In this case means 26 are also provided that ensure a barrier between the drums 12, 13 and the openings 28 concerned in the housing 2.

In this case these means 26 again concern seals, but it is not excluded that use is made of labyrinth seals or brushes.

The ends 27 of the drum 12, 13 are closed off by guards 10, whereby in this case the guard 10 of the conveyor belt 11 and the guard 10 of the drums 12, 13 form a single unit on both sides of the housing 2.

The drive means for driving the drive drum 12, such as an electric motor or similar for example, can be outside the housing 2, in the guard 10 or in the drive drum 12 itself, or otherwise.

In the example of the drawings there is a motor outside the housing 2.

The operation of the closed conveyor belt 1 is very simple and as follows.

The material to be transported, such as shredded or ground plastic waste for example, can be introduced in the housing 2 on the conveyor belt 11 via the input opening 3.

The inlet hopper 5 will provide the guide for the plastic shreds, so that all the material comes onto the top track 14 of the conveyor belt 11.

The drive drum 12 will set the conveyor belt in motion in the direction of the arrow P, such that the material on the top track 14 will move towards the output opening 4.

The catches 19 will hereby carry the material along as it were, which can be important when the conveyor belt 11 is placed at a shallow ascending angle, for example. When the conveyor belt 11 is placed at a shallow descending angle, the catches 19 will ensure that the material is held back as it were so that not everything slides to the output opening 4 at the same time, but is gradually brought to the output opening 4.

When relatively heavy products or materials are transported with the conveyor belt 11, the flat plate 20 will ensure that the top track 14 remains nicely flat and will not sag under the influence of the weight of the products or materials. This will guarantee the good operation of the conveyor belt 11.

The protruding parts 23 and 27 respectively of the conveyor belt 11 and drums 12, 13 will be covered by the guards 10 so that no moving parts are free during the operation of the closed conveyor belt 1. This will increase safety and can prevent damage to these moving parts.

When the material is at the location of the drive drum 12 it will go into the output opening 4, due to the conveyor belt 11 turning around, and leave the closed conveyor belt 1 via the outlet hopper 6.

The outlet hopper 6 will ensure that when leaving the housing 2, the material is guided in the right direction.

It is clear that the shape of the inlet hopper 5 and the outlet hopper 6 is not limited to the shapes shown in the drawings.

After reversing the conveyor belt 11, the bottom track 15 will move forwards to the return drum 13 in the opposite direction to the top track 14.

There the conveyor belt 11 will reverse again as it were and the process can be repeated.

The present invention is by no means limited to the embodiments described as an example and shown in the drawings, but a closed conveyor belt according to the invention can be realised in all kinds of forms and dimensions without departing from the scope of the invention.

The invention claimed is:

1. Closed conveyor belt with a housing (2) that encloses a conveyor belt (11) that can be set in motion along a path by a drive, wherein both edges (22) of the conveyor belt (11), that extend in the direction of movement (P) of the conveyor belt, extend through the housing (2) by a protruding section (23) that extends through slots (24) provided to this end in the housing (2), the slots following an entirety of the path of the conveyor belt.

2. Closed conveyor belt according to claim 1, wherein the drive is formed by a return drum (13) and drive drum (12) whereby the ends (27) of the return drum (13) and/or the drive drum (12) extend through the housing (2) through openings (28) provided to this end in the housing (2).

3. Closed conveyor belt according to claim 1, wherein means (26) are provided that ensure a barrier between the protruding section (23) and the slot (24) in the housing (2).

4. Closed conveyor belt according to claim 3, wherein the means (26) comprise at least one seal, labyrinth seal or brush.

5. Closed conveyor belt according to claim 1, wherein the slot (24) and/or the opening (28) are realised by the housing (2) being assembled from different parts (7a-7d), whereby cutaways are formed to form the slot (24) and/or the opening (28) between the different parts (7a-7d) after they have been assembled to form the housing (2).

6. Closed conveyor belt according to claim 1, wherein the protruding section (23) of the conveyor belt (11) is covered by a guard (10).

7. Closed conveyor belt according to claim 2, wherein the end (27) of the return drum (13) and/or drive drum (12) is closed off by a guard (10).

8. Closed conveyor belt according to claim 7, wherein the protruding section (23) of the conveyor belt (11) is covered by a guard (10), and the guards (10) form one unit.

9. Closed conveyor belt according to claim 1, wherein the conveyor belt (11) is provided with catches (19) that extend transversely to the direction of movement (P) of the conveyor belt (11).

10. Closed conveyor belt according to claim 1, wherein the housing (2) is provided with an input opening (3) and an output opening (4) for the input and output respectively of the material or products to be transported.

11. Closed conveyor belt according to claim 10, wherein the input opening (3) and/or the output opening (4) are provided with an inlet hopper (5), an outlet hopper (6) respectively.

12. Closed conveyor belt according to claim 2, wherein drive means for driving the drive drum (12) are outside the housing (2) or in the drive drum (12).

13. Closed conveyor belt according to claim 1, wherein the conveyor belt (11) is at least partially supported by a flat plate (20) or similar.

14. Closed conveyor belt according to claim 13, wherein flat plate (20) extends through the slots (24) by two opposite edges (25).

15. Closed conveyor belt according to claim 13, wherein flat plate (20) is supported by means of reinforcing ribs (21) or supporting slats that are provided in the interspace (18) enclosed by the conveyor belt (11), whereby the reinforcing ribs (21) or supporting slats are placed in crossed pairs.

16. Closed conveyor belt according to claim 2, wherein means (26) are provided that ensure a barrier between the protruding section (23) and the slot (24) in the housing (2) and/or between the drive drum (12) and the opening (28)

concerned in the housing (2) and/or between the return drum (13) and the opening (28) concerned in the housing (2).

17. Closed conveyor belt according to claim 14, wherein flat plate (20) is supported by means of reinforcing ribs (21) or supporting slats that are provided in the interspace (18) enclosed by the conveyor belt (11), whereby the reinforcing ribs (21) or supporting slats are placed in crossed pairs.

18. A closed conveyor belt comprising:
   a housing;
   a conveyor belt enclosed in the housing and following a closed path when viewed from a side of the conveyor belt;
   a drive that moves the conveyor belt;
   the housing having a slot completely through a side of the housing, the slot following an entirety of the closed path of the conveyor belt; and
   the conveyor belt having an edge with a protruding section that extends through the slot to outside of the housing.

19. A conveyor belt structure comprising:
   a housing having two opposite sides that each has a slot therein;
   a conveyor belt between the two opposite sides and following a closed path when viewed from a side of the conveyor belt; and
   a drive that moves the conveyor belt,
   wherein the slots in the two opposite sides follow an entirety of the closed path of the conveyor belt, and
   wherein the conveyor belt has opposite edges that each has a protruding section that extends through a respective one of the slots to outside a respective one of the two sides.

* * * * *